United States Patent
Aggarwal et al.

(10) Patent No.: US 12,506,698 B2
(45) Date of Patent: Dec. 23, 2025

(54) INITIALIZING A CONVERSATION WITH AN AUTOMATED AGENT VIA SELECTABLE GRAPHICAL ELEMENT

(71) Applicant: GOOGLE LLC, Mountain View, CA (US)

(72) Inventors: Vikram Aggarwal, Palo Alto, CA (US); Dina Elhaddad, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 181 days.

(21) Appl. No.: 18/214,239

(22) Filed: Jun. 26, 2023

(65) Prior Publication Data

US 2023/0336505 A1    Oct. 19, 2023

Related U.S. Application Data

(63) Continuation of application No. 16/264,083, filed on Jan. 31, 2019, now Pat. No. 11,689,480, which is a
(Continued)

(51) Int. Cl.
*G10L 15/22* (2006.01)
*G06F 9/06* (2006.01)
(Continued)

(52) U.S. Cl.
CPC ............. *H04L 51/02* (2013.01); *G06F 9/06* (2013.01); *G06F 9/453* (2018.02);
(Continued)

(58) Field of Classification Search
CPC ................................ G10L 15/22; G06F 9/453
See application file for complete search history.

(56) References Cited

U.S. PATENT DOCUMENTS 7,562,009 B1   7/2009   Emerson et al.
8,995,972 B1   3/2015   Cronin
(Continued)

FOREIGN PATENT DOCUMENTS

CN    1643575    7/2005
CN    101848187  9/2010
(Continued)

OTHER PUBLICATIONS

European Patent Office; Minutes issued in Application No. 18726899.0, 15 pages, dated Dec. 19, 2022.
(Continued)

*Primary Examiner* — Bryan S Blankenagel
(74) *Attorney, Agent, or Firm* — Gray Ice Higdon

(57) ABSTRACT

Methods, apparatus, systems, and computer-readable media are provided for invoking an agent module in an automated assistant application in response to user selection of a selectable element presented at a graphical user interface rendered by a non-automated assistant application. The invoked agent module can be associated with other content rendered in the non-automated assistant graphical user interface, and can optionally be invoked with values that are based on user interactions via the non-automated assistant application. Responsive content can be received from the agent module in response to the invocation, and corresponding content provided by the automated assistant application via an automated assistant interface. In these and other manners, selection of the selectable element causes transition from a non-conversational interface, to a conversational automated assistant interface—where an agent (relevant to content in the non-conversational interface) is invoked in the automated assistant interface.

20 Claims, 8 Drawing Sheets

Related U.S. Application Data continuation of application No. 15/589,645, filed on May 8, 2017, now Pat. No. 10,237,209.

(51) Int. Cl.
  *G06F 9/451*    (2018.01)
  *G06F 16/3329*  (2025.01)
  *G06F 40/10*    (2020.01)
  *H04L 51/02*    (2022.01)
  *H04L 51/046*   (2022.01)

(52) U.S. Cl.
  CPC .......... *G06F 16/3329* (2019.01); *G06F 40/10* (2020.01); *G10L 15/22* (2013.01); *H04L 51/046* (2013.01)

(56) References Cited

U.S. PATENT DOCUMENTS

| | | | |
|---|---|---|---|
| 9,047,259 | B1 | 6/2015 | Ho et al. |
| 9,584,668 | B1 | 2/2017 | Kammeyer et al. |
| 2004/0199486 | A1 | 10/2004 | Gopinath et al. |
| 2004/0260817 | A1 | 12/2004 | Binding et al. |
| 2007/0154007 | A1 | 7/2007 | Bernhard |
| 2007/0156805 | A1 | 7/2007 | Bristol et al. |
| 2013/0167124 | A1 | 6/2013 | Amit |
| 2013/0218782 | A1 | 8/2013 | Singal et al. |
| 2013/0226580 | A1* | 8/2013 | Witt-Ehsani ............ G06F 3/167 704/244 |
| 2013/0332172 | A1 | 12/2013 | Prakash et al. |
| 2014/0244266 | A1 | 8/2014 | Brown et al. |
| 2014/0317502 | A1 | 10/2014 | Brown et al. |
| 2014/0365885 | A1 | 12/2014 | Carson et al. |
| 2014/0372867 | A1 | 12/2014 | Tidhar et al. |
| 2014/0379840 | A1 | 12/2014 | Dao |
| 2015/0008897 | A1 | 1/2015 | Riesemann et al. |
| 2015/0081361 | A1 | 3/2015 | Lee et al. |
| 2015/0088974 | A1 | 3/2015 | Anderson |
| 2015/0117631 | A1 | 4/2015 | Tuchman et al. |
| 2015/0186156 | A1 | 7/2015 | Brown et al. |
| 2015/0324458 | A1 | 11/2015 | Kurisu et al. |
| 2016/0044380 | A1 | 2/2016 | Barrett |
| 2016/0070580 | A1 | 3/2016 | Johnson et al. |
| 2016/0119477 | A1 | 4/2016 | Sharpe et al. |
| 2016/0182709 | A1 | 6/2016 | Kim et al. |
| 2016/0360466 | A1 | 12/2016 | Barak et al. |
| 2017/0289339 | A1 | 10/2017 | Riva et al. |
| 2018/0082683 | A1 | 3/2018 | Chen et al. |
| 2018/0096440 | A1* | 4/2018 | Lopez ................ G06Q 30/0259 |
| 2018/0103150 | A1 | 4/2018 | Chavez et al. |
| 2018/0324115 | A1 | 11/2018 | Aggarwal et al. |
| 2018/0367641 | A1 | 12/2018 | Micke |
| 2019/0166073 | A1 | 5/2019 | Aggarwal et al. |
| 2019/0362252 | A1* | 11/2019 | Miller ...................... G06N 5/04 |
| 2020/0243186 | A1 | 7/2020 | Gallopyn et al. |
| 2021/0190525 | A1 | 6/2021 | Santamaria et al. |

FOREIGN PATENT DOCUMENTS

| | | |
|---|---|---|
| CN | 102750271 | 10/2012 |
| CN | 102792320 | 11/2012 |
| CN | 102844738 | 12/2012 |
| CN | 104335560 | 2/2015 |
| CN | 105247511 | 1/2016 |
| CN | 105264524 | 1/2016 |
| CN | 105808200 | 7/2016 |
| CN | 106325113 | 1/2017 |
| JP | 2002024285 | 1/2002 |
| JP | 2013517566 | 5/2013 |
| KR | 1020120137434 | 12/2012 |
| KR | 20130000423 | 1/2013 |
| KR | 20160004351 | 1/2016 |
| WO | 2011088053 | 7/2011 |
| WO | 2014061985 | 4/2014 |

OTHER PUBLICATIONS

European Patent Office; Intention to Grant issued in Application No. 18726899.0, 14 pages, dated Jan. 2, 2023.
European Patent Office; Communication issued in U.S. Appl. No. 22/212,953; 11 pages; dated Mar. 3, 2023.
European Patent Office; Preliminary Opinion issued in Application No. 18726899.0, 12 pages, dated Oct. 19, 2022.
European Patent Office; Summons to Attend Oral Proceedings pursuant to Rule 115(1) issued in Application No. 18726899.0, 10 pages, dated Mar. 1, 2022.
The Korean Intellectual Property Office; Notice of Allowance issue in Application No. 10-2019-7036264; 3 pages; dated Jan. 26, 2022.
Intellectual Property India; Examination Report issued in Application No. 201927050218; 8 pages; dated Oct. 8, 2021.
The Korean Intellectual Property Office; Office Action issued in Application No. 1020207028448; 6 pages; dated Aug. 27, 2021.
Japanese Patent Office; Notice of Allowance issue in Application No. 2020117027; 3 pages; dated Jul. 26, 2021.
China National Intellectual Property Administration; Notice of Grant issue in Application No. 201880030291.5; 3 pages; dated Dec. 9, 2020.
European Patent Office; Communication Pursuant to Article 94(3) EPC; 7 pages; dated Dec. 7, 2020.
China National Intellectual Property Administration; Notification of First Office Action issue in Application No. 201880030291.5; 10 pages; dated Jun. 9, 2020.
Japanese Patent Office; Notice of Allawance issue in Application 2019-561323; 3 pages; dated Jun. 8, 2020.
The Korean Intellectual Property Office; Notice of Allowance issue in Application No. 10-2019-7036264; 6 pages; dated Jul. 2, 2020.
The Korean Intellectual Property Office; Notice of Office Action issue in Application No. 10-2019-7036264; dated Mar. 24, 2020.
International Search Report and Written Opinion of PCT Ser. No. PCT/US2018/031448; 17 pages Jul. 11, 2018.
China National Intellectual Property Administration; Notice of Grant issue in Application No. 202110200507.1; 4 pages; dated May 27, 2024.
Intellectual Property India; Hearing Notice issued in Application No. 201927050218; 3 pages; dated Dec. 21, 2023.
China National Intellectual Property Administration, Notification of First Office Action issued in Application No. 202110200507.1; 14 pages; dated Dec. 7, 2023.
European Patent Office; Intention to Grant issued in Application No. 22212953.8, 42 pages, dated Oct. 9, 2025.

\* cited by examiner

INITIALIZING A CONVERSATION WITH AN AUTOMATED AGENT VIA SELECTABLE GRAPHICAL ELEMENT

BACKGROUND

Automated assistants (also known as "personal assistant modules", "mobile assistants", or "chat bots") may be interacted with by a user via a variety of computing devices, such as smart phones, tablet computers, wearable devices, automobile systems, standalone personal assistant devices, and so forth. The automated assistants receive input from the user (e.g., typed and/or spoken natural language input) and respond with responsive content (e.g., visual and/or audible natural language output).

An automated assistant may provide a broad range of functionality through interactions with various local and/or third-party agents. For a user to utilize the automated assistant to perform a particular function, oftentimes the user must first explicitly invoke the automated assistant (e.g., through a particular verbal phrase and/or particular hardware input), then provide a particular invocation phrase associated with the particular function. The invocation phrase invokes, via the automated assistant, an agent that can perform the particular function. However, a user may be unaware of various functionalities of an automated assistant and/or may be unaware of invocation phrases to invoke such functionalities via the automated assistant. Furthermore, a user may be unaware that, although one of their devices may not have the automated assistant loaded for answering queries (e.g., obtaining flight details from a tablet), the user can obtain answer from other devices that have the automated assistant. As a result, in some situations the user may utilize other less resource efficient applications for performing the particular function. Furthermore, even if the user invokes the automated assistant, in some situations the user may still need to engage in extensive resource intensive interactions (e.g., dialog turns) with the automated assistant to discover how to perform the particular function via the automated assistant. For instance, a large quantity of dialog turns may be required for the user to even discover that the automated assistant is capable of enabling performance of the particular function.

SUMMARY

Techniques are described herein for invoking an automated assistant to communicate with an agent module associated with an application. Some implementations enable a selectable element to be presented to a user in a non-automated assistant graphical user interface of an application that is separate from an automated assistant application. In response to user selection of the selectable element, an automated assistant can invoke an agent module that corresponds to the selectable element, and that is associated with content presented via the non-automated assistant interface. In some of those implementations, the selectable element is selectable in a single-tap, single-click, or other "single selection" manner. In these and other manners, a user can select a selectable element to transition from a non-conversational interface, to a conversational automated assistant interface—where an agent (relevant to the content in the non-conversational interface) is invoked in the automated assistant interface. In some implementations, by invoking an agent in an automated assistant interface in such a manner, a quantity of inputs required by a user to perform a function of the agent module can be reduced. This reduction in inputs can save computational resources and benefit various users such as, for example, those users that have issues with dexterity. Further, discovery of various automated assistant functionalities can be promoted, thereby promoting usage of the potentially more resource efficient automated assistant interface for further interactions.

In some implementations, a method implemented by one or more processors is set forth as including steps such as receiving a selection of a selectable element at a graphical user interface rendered by a non-automated assistant application of a computing device. The selectable element can indicate an agent associated with the graphical user interface can be invoked via an automated assistant application that is separate from the non-automated assistant application. The steps can further include, in response to the selection of the selectable element, invoking the agent via the automated assistant application. The agent can be one of a plurality of available agents that can be invoked via the automated assistant application. The steps can further include receiving responsive content from the agent in response to invoking the agent, and providing, by the automated assistant application via an automated assistant interface, output that is based on the responsive content received from the agent.

In other implementations, a method implemented by one or more processors is set forth as including steps such as causing a selectable element to be displayed at a computing device that is operating a non-automated assistant application. The selectable element can be configured to cause an automated assistant to initialize an agent module associated with the non-automated assistant application. The steps can further include receiving a selection of the selectable element, and in response to receiving the selection of the selectable element, determining whether the automated assistant is accessible to the computing device. The steps can also include, when it is determined that the automated assistant is inaccessible to the computing device: executing a link corresponding to the selectable element to cause a default webpage to open and present speakable command phrases for communicating with the agent module.

In yet other implementations, a non-transitory computer readable medium is set forth as storing instructions that, when executed by one or more processors, cause the one or more processors to perform steps that include: determining that a user is viewing an application interface of a non-automated assistant application. The application interface can include a first selectable element for initializing communications with an agent module via an automated assistant application. The agent module can be configured to perform an action associated with the non-automated assistant application. The steps can further include receiving a selection of the first selectable element. The first selectable element can include a link that identifies the agent module and a parameter for performing the action. The steps can also include causing a conversational interface to be presented to the user. The conversational interface can be configured by the automated assistant to be an intermediary between the user and the agent module. Furthermore, the steps can include providing a second selectable element at the conversational interface. The second selectable element can be based on the parameter identified in the link to further the action.

DETAILED DESCRIPTION

The described implementations relate to systems, methods, and apparatuses for using an automated assistant to interact with an agent module associated with an application. As one example, assume a user has accessed an "order pizza" webpage of Pizza Company via a web browser application of a client device. A selectable element may be presented via the web browser application that, when selected, causes an automated assistant application of the client device to invoke an agent of "Pizza Company", and present the user with automated assistant interface output generated by the agent of "Pizza Company". In other words, in response to selection of the element, the automated assistant application can invoke the agent to enable the user to engage in a dialog with the agent via the automated assistant interface. In some implementations, the selectable element can be included as content of the webpage (e.g., embedded in the webpage by the Pizza Company). Further, in some implementations, in response to selection of the selectable element, the agent can be invoked with value(s) for an intent and/or intent parameters (e.g., "slot values") that are based on interactions of the user via the web browser application. For example, if the user has interacted with the "order pizza" webpage to select a "Large 1 topping" pizza, the agent can be invoked with an "order pizza" intent and with slot values of "large" and "1 topping".

Figure 1A:
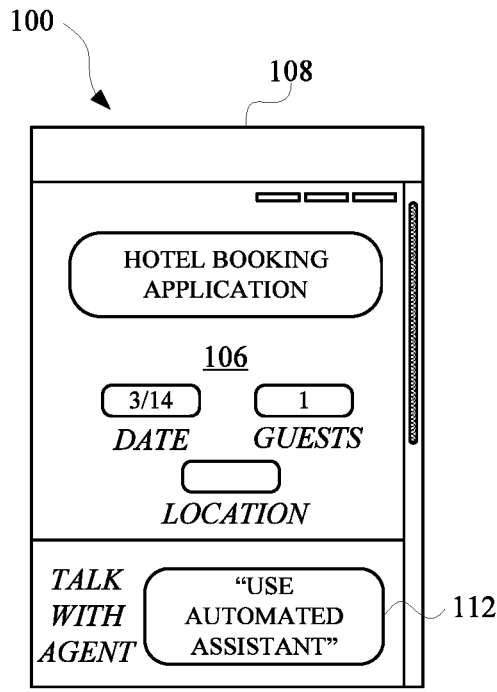
FIG. 1A, FIG. 1B, and FIG. 1C illustrate diagrams of a user activating a conversational user interface at a mobile device.
Figure 1B:
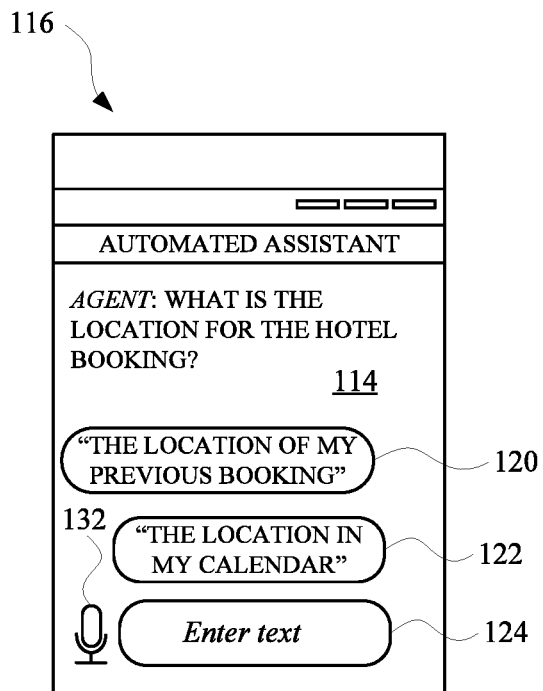
Figure 1C:
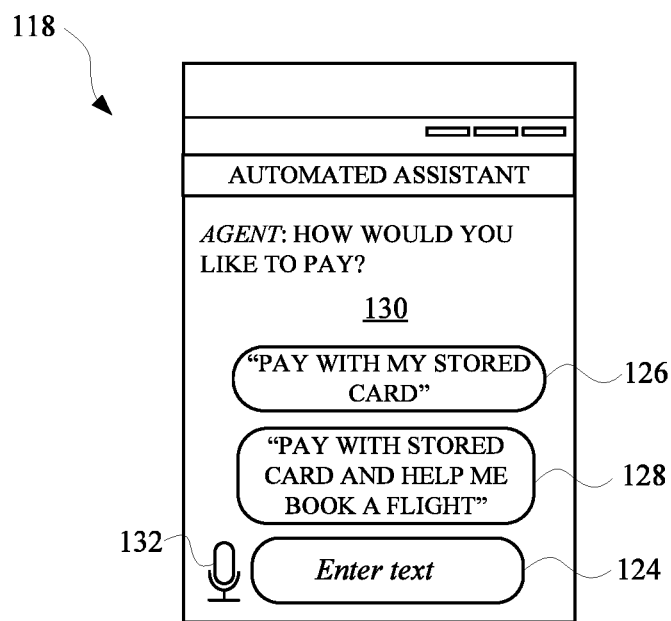

FIGS. 1A-1C illustrate diagrams of a conversational user interface 114 being activated from an application 106 of a mobile device. Specifically, FIG. 1A illustrates a diagram 100 of an application 106 displayed at a user interface 108 of the mobile device. The application 106 can be, for example, a hotel booking application that allows the user to book a hotel via the user interface. The mobile device can include an automated assistant, or communicate with an automated assistant at a separate device, for assisting with various functions of the mobile device. For example, the automated assistant can be responsive to spoken commands, and convert the spoken commands into text that can be used by an agent module associated with an application, such as the application 106. The applications of the mobile device 104 can be associated with agent modules specifically designed to assist the user with performing a function associated with the application 106. In some implementations, the automated assistant can initialize a verbal or textual conversation with the user and act as an intermediary between the user and an agent module associated with an application 106. However, the user may not be aware of speakable commands available for the automated assistant or the agent module associated with the application 106, thereby leaving the user with less efficient means for interacting with the agent module. In order to introduce the user to speakable commands available for communicating with the agent module via the automated assistant, the automated assistant can provide a conversational user interface 114 that is initialized via selection of a first selectable element 112.

The first selectable element 112 can include a phrase that indicates to the user that the user can use their automated assistant to communicate with an agent module associated with the application 106. For example, the first selectable element 112 can include the phrase "Use Automated Assistant," putting the user 102 on notice that the user is able to perform functions related to the application 106, or agent module, through their automated assistant. Initially, if the user 102 is not aware of any speakable commands, the user 102 can either select the first selectable element 112 or speak the phrase "Use Automated Assistant." In response to the user 102 selecting the first selectable element 112 or speaking the phrase "Use Automated Assistant," the automated assistant can initialize and invoke an agent module corresponding to the application 106. The first selectable element 112 can be associated with a link or command that specifically identifies the agent module and/or a command or intent to be performed by the agent module. In some implementations, the link can be a universal resource locator (URL) such as "http://assistant.url/hotel-agent-module/hotel-booking" or any command that identifies the agent module. The link can also include any information provided by the user to the application before selecting the first selectable element 112. For example, as illustrated in FIG. 1A, the user may have already selected a date for the hotel booking ("3/14") and a number of guests ("1"). The link can therefore identify the agent module and include the date and number of guests. In this manner, the automated assistant can be put on notice of the progress of the hotel booking, and can invoke the agent with the specified date and number of guests. For example, the agent can be invoked with a "hotel booking" intent, and with a value of "3/14" for a "date" slot parameter and a value of "1" for a "number of guests" slot parameter. An example of such a link can be "http://assistant.url/agent-module/hotel-booking-date_0314_guests_1." In some implementations, the link or command can include opaque parameters (e.g., " . . . /date_889293") for concealing the details of how the agent receives inputs from the automated assistant in order to eliminate damage caused be malicious URL creators.

In some implementations, in response to the user selecting the first selectable element 112, the automated assistant can use the link and agent module identifier in the link to determine whether an agent module is accessible to the automated assistant. If the agent module is available to the automated assistant, the automated assistant can invoke the agent module and can optionally present the user with commands available for further interacting with the agent module. For example, in FIG. 1B the agent module associated with application 106 has been invoked in the conversational interface 114, and output ("AGENT: WHAT IS . . . ") is presented in the conversational interface that is based on responsive content generated by the agent module in response to the invocation. For instance, the agent module may have been invoked with a "hotel booking" intent and, in response, provided the output illustrated in FIG. 1B.

In some implementations, the automated assistant can access an index of historical commands provided to the application 106. The automated assistant can use the index of historical commands to make suggestions for the user to interact with the agent module. Once a corresponding agent module has been identified, or historical commands have been identified, the automated assistant or other application on the mobile device 104 can present a list of commands to the user in a conversational user interface 114, as provided in diagram 116 of FIG. 1B. For example, a suggestion element 120 can be provided with a phrase "The location of my previous booking." If the suggestion element 120 is selected, the automated assistant can direct the agent module to book the location of the hotel as the same location the user previously booked the hotel. The automated assistant can determine the location of the previous hotel booking searching user data corresponding to interactions between the user and the application 106. Alternatively, a suggestion element 122 can be provided with a phrase "The location in my calendar." If suggestion element 122 is selected, the automated assistant can direct the agent module to book the location of the hotel according to an event that is stored in the calendar of the user at the date indicated in the link ("3/14"). The automated assistant can also provide a text input element 124 that, when selected, allows the user to type an input into the conversational user interface 114, and a vocal input element 132 that, when selected, allows the user to speak an input to the automated assistant. In this way, the user can optionally choose between selecting a suggested input for the agent module, or providing a textual or a verbal input to the agent module via the automated assistant. The input from the user can then be provided to the agent module by the automated assistant, to enable the agent module to generate further responsive content that continues the dialog.

The list of commands can include commands for furthering an operation, which was begun at the application, using an interaction between the automated assistant and the agent module. The list of commands can be speakable commands understood by the agent module, or textual commands that can be spoken by the user and converted to text using the automated assistant or other application on the mobile device or remote device. For example, the link associated with the first selectable element 112 can identify a modality for how the automated assistant will receive input and/or provide output. The modality can be text, voice, or any other medium for receiving input and providing output. The modality can be identified in the link that is provided to the automated assistant. For example, the link can identify the agent module, the intent or action, and/or the modality (e.g., "http://assistant.url/agent-module/hotelbooking-text_modality").

In response to the user selecting any of the suggestion elements 120, 122, or 124 at diagram 116 of FIG. 1B, the conversational user interface 114 can be updated, as illustrated in diagram 118 of FIG. 1C. The updated conversational user interface 130 of FIG. 1C can include further responsive content from the agent module. For example, once the automated assistant has communicated the location for the hotel booking to the agent module, the agent module can send further responsive content to the automated assistant corresponding to payment for the hotel booking. The automated assistant can present the user with optional response elements for responding to the agent module. The automated assistant can use the response content from the agent module to search user data accessible to the automated assistant, and generate selectable responses based on the search. For example, because the agent module has provided a query to the automated assistant asking for payment, the automated assistant can search the user data for payment information. If the automated assistant determines that the user has a stored payment card on the mobile device, the automated assistant can present a response element 126 that includes the phrase "Pay with my stored card." In some implementations, the automated assistant can predict that the user would also like to perform some other function once the interaction with the agent module is complete. In such cases, the automated assistant can present the user with a dual agent response element 128 that can be responsive to one agent module (e.g., the hotel booking agent module) and invoke another agent module for completing the other function (e.g., booking a flight). For example, the automated assistant can provide a dual agent response element 128 that includes the phrase "Pay with stored card . . . ," which when spoken or selected can direct the agent module to charge the user for the hotel booking using the stored card. Simultaneously, the automated assistant can provide the phrase " . . . and help me book a flight" with the dual agent response element 128. In response to the user selecting the dual agent response element 128, the automated assistant can also invoke an agent module corresponding to a flight booking application or website. In this way, the number of inputs required by the user to perform certain operations can be reduced. This can be beneficial for users with dexterity issues or other ailments that may prevent the user from effectively providing inputs to the mobile device.

Figure 2:
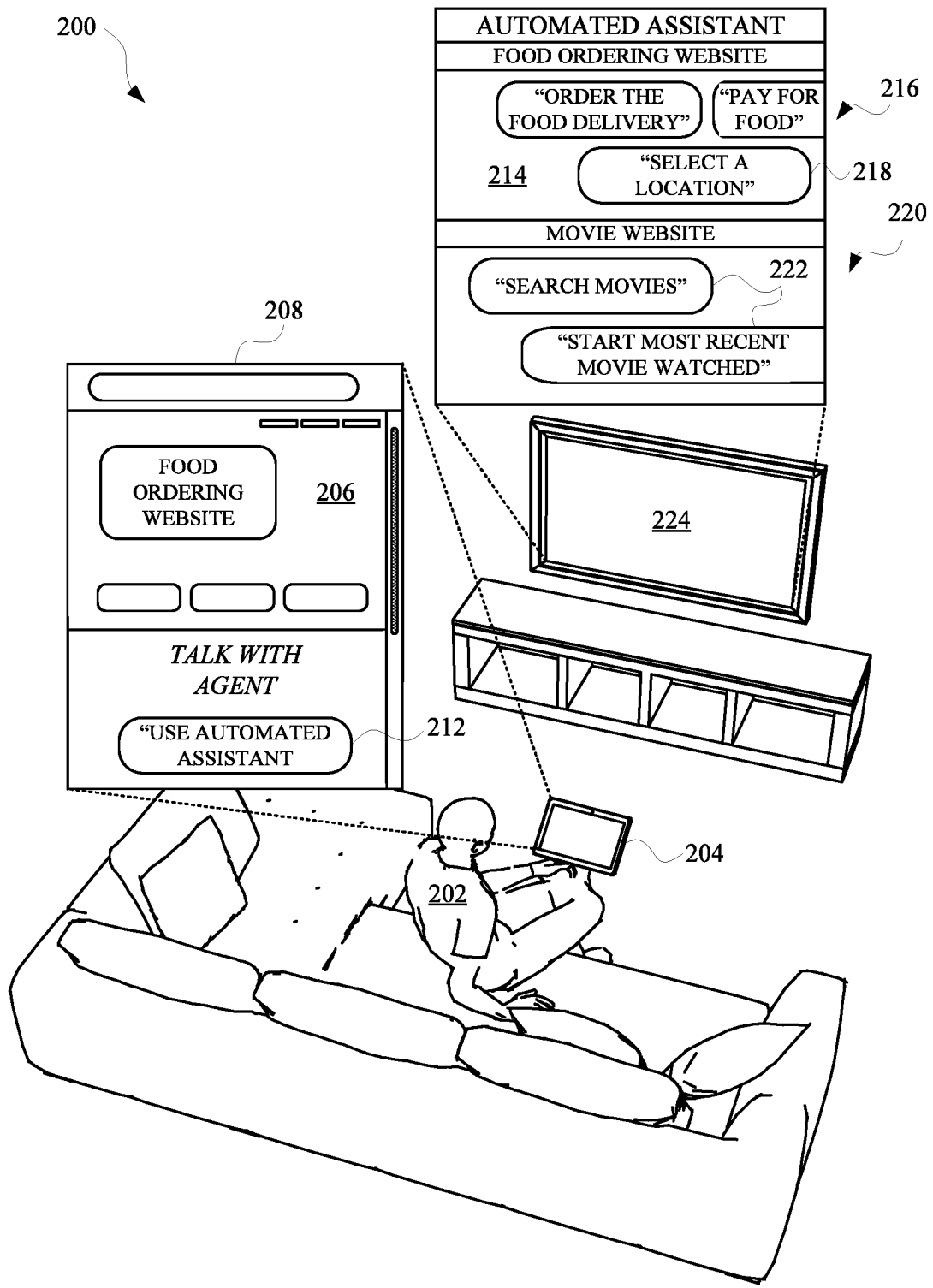
FIG. 2 illustrates a conversational user interface that can be used to interact with an agent module associated with a website.

FIG. 2 illustrates a conversational user interface 214 that can be used to interact with an agent module associated with a website 206. While browsing the website 206 on a mobile device 204, the user 202 may not be aware that certain functions associated with the website 206 can be controlled through speakable commands that can be interpreted by an automated assistant and/or an agent module. In order to make the user 202 more familiar with the speakable commands, the user 202 can be directed to initialize an automated assistant, which can provide a conversational user interface 214 according to the implementations described herein. For example, the user 202 can be browsing a food ordering website 206, as illustrated in diagram 200 of FIG. 2. While viewing the website 206, the user 202 can identify a first selectable element 212 presented at a user interface 208 of the mobile device 204. The first selectable element 212 can include a phrase that indicates to the user 202 that the automated assistant can be used to interact with an agent module associated with the website 206 for performing certain functions associated with the website 206. For example, the first selectable element 212 can include the phrase "Use automated assistant," as illustrated in FIG. 2. The first selectable element 212 can be associated with a link, such as a URL, which can be provided to the automated assistant for opening a conversational user interface at the mobile device 204. For example, the link can identify an agent module that is suitable for receiving speakable commands from the user 202 for performing a function (e.g., ordering food) associated with the website 206. Such a link can, for example, have the structure: http://assistant.url/food%ordering%agent%module, where the "%" indicates a space character and the type of agent module (e.g., "food ordering") is identified after the host name. In some implementations, if the mobile device 204 includes a third party application corresponding to the website 206 (e.g., a food ordering application), the link can be transferred by the automated assistant to the third party application for continuing a conversation between the user 202 and the food ordering application. Otherwise, the link can be received by the automated assistant to provide a conversational user interface 214, either at the mobile device 204 or a separate computing device 224.

As yet another example, the website 206 can be a food delivery ordering website where the user can interact with the website 206 (e.g., via drop-down menus, radio buttons, free-form text) to select items and/or ingredients for a food order (e.g., toppings for a pizza), and can optionally finalize and pay for the order for delivery. If the user partially fills out the food order through interaction with the website 206, values for one or more of the selected ingredients can be transmitted to the automated assistant to enable the automated assistant to invoke an agent module, associated with the website 206, with such values (e.g., to include such values as slot values transmitted to the agent module in an invocation of the agent module). In some implementations, a server that hosts the website 206 can generate such values for passing to the automated assistant. For example, a link for a selectable graphical element can be dynamically generated by the server in response to interactions with the website 206 by the user, such that the link includes indications of such values (e.g., "http://assistant.url/agent-module/order-pizz_toppings=pepperoni-mushroom-peppers"). For instance, the link associated with the selectable graphical element can be dynamically updated by the server in response to the user's interactions with the web site 206. As another example, the server can transmit a command, in response to selection of the selectable graphical element, where the command includes such values, and optionally also indicates the agent module. For instance, a command provided to the automated assistant from the server can be tailored by the server to include the toppings selected for the pizza via interaction of the user with the website 206 (e.g., a command of "ACTION=com.assistant.toppings_pepperoni-bacon-onion-.StartConversation"). In some implementations, the automated assistant itself can process contents of the interface of the website 206 to directly determine such values. For example, one or more screenshots of the interface can be processed to determine text of titles of fields and/or selected values for the fields, and such titles and/or values utilized to determine appropriate values for passing to the agent module with an invocation request. In some implementations where values derived from a user's interaction with a non-automated assistant interface are utilized in the invocation of an associated agent module, duplicative reentry of such values through the automated assistant interface can be reduced (e.g., eliminated). This may conserve various resources, as the agent module can be invoked with such values—thereby eliminating the need for dialog turn(s) via an automated assistant interface to define such values.

In some implementations, the automated assistant may not be available at the mobile device 204 that is viewing the website 206, however, the mobile device 204 can be connected, over a network, to a separate computing device 224 that includes the automated assistant. In this implementation, when the user 202 selects the first selectable element 212, the mobile device 204 can provide the link (or other content) to the computing device 224 for invoking the automated assistant at the computing device 224. The automated assistant can use the link to identify an agent module and identify data related to the status of a current operation being performed at the website 206.

The conversational user interface 214 can include multiple different selectable elements that include phrases corresponding to speakable commands for interacting with the agent module via the automated assistant. The phrases can be based on results of the automated assistant processing contents of the website, preconfigured commands provided to the automated assistant by the agent module or website, and/or historical interactions of the user with the website as recorded by the automated assistant. For example, a selectable element at the conversational user interface 214 can include a phrase such as "Order the food delivery," which can be based on a status of the order as detailed in the link (or other command) provided to the automated assistant. This phrase can be spoken by the user 202 and converted into text by the automated assistant. The text can thereafter be provided to the agent module associated with the website 206. The agent module can receive the text and complete the food delivery according to the text.

In some implementations, the link can include parameters for guiding the automated assistant during the interaction with the agent module. For example, the user 202 can at least partially fill out a food ordering website 206 before selecting the first selectable element 212. The portion of the website 206 filled out by the user 202 can include order data such as a location for delivery, an amount of food, and/or a drink order. This data can be embodied in a link that corresponds to the first selectable element 212. For example, the link corresponding to the first selectable element 212 can be, "http://assistant.url/agent-module/breakfast-order/drink-coffee-location-market-street"). The link can be parsed by the automated assistant in order to identify parameters for a subsequent action or intent to be performed by the agent module. For example, the intent "breakfast-order" as identified in the link can include multiple parameters that need to be identified before the intent can be completed. The automated assistant can use the parameters "coffee" and "market street" to inform the user of the current status of the order, as well as request additional information for completing the order (e.g., "Pay for food").

In some implementations, each of the selectable elements provided at the conversational user interface 214 can be preconfigured according to content of the website 206. In other words, the automated assistant and/or a parser engine of the mobile device 204 can process the content of the website 206 in order to generate selectable elements and/or speakable commands for interacting with the website 206. In other implementations, an agent module of the website 206 can be associated with preconfigured commands and parameters that can be stored on, or accessible to, the mobile device 204 or the computing device 224. These preconfigured commands and parameters can be processed by the automated assistant and/or a parser engine of the mobile device 204 for generating speakable commands and/or selectable elements for interacting with the agent module via the automated assistant. In this way, the user 202 can be made aware of the ability to vocally interact with the website 206 or agent module in order to streamline functions of the website 206 by not relying on fully typing out commands. This can be beneficial for users that are fatigued or have dexterity issues.

In some implementations, the website 206 can be associated with multiple different agent modules and the automated assistant can identify the most suitable agent module to initialize according to present and/or previous activities of the user 202. For example, the user 202 can be viewing a food ordering website 206 and the food ordering website 206 can be associated with multiple different agent modules that can each specialize in ordering a specific type of food. For example, a first agent module can specialize in ordering breakfast food and a second agent module can specialize in ordering dinner food. The automated assistant can determine that the user 202 is more likely interested in ordering breakfast food and provide a selectable element that includes the speakable command 'Talk to an agent about ordering breakfast food." The automated assistant can determine the user 202 is more likely to order breakfast food based on a time of day that the user 202 is viewing the website 206, past history of ordering breakfast food from the website, media accessible to the mobile device 204 such as messages and/or calendar entries, and/or any other data suitable for use when predicting an action of the user 202. The selectable element provided by the website can correspond to a link that specifically identifies the multiple different agent modules. For example, the selectable element can correspond to a command that lists agent modules for the automated assistant to select from and initialize (e.g., "ACTION=com.assistant.BreakfastAgentModule.StartConversation, com.assistant.LunchAgentModule.StartConversation, OR com.assistant.DinnerAgentModule.StartConversation"). The command can be provided at the website 206 for receipt by the automated assistant. Alternatively, the selectable element can correspond to a link that identifies the agent modules (e.g., "http://assistant.url/agentmodules/breakfast-agent_lunch-agent_dinner-agent"). The link or command can then be received by the automated assistant so that the automated assistant can selected the most suitable agent module to initialize based on analysis of the user data.

In some implementations, when the automated assistant is initialized at the computing device 224 from the mobile device 204, the automated assistant can analyze user data to determine whether another agent should be initialized from the computing device 224. For example, the automated assistant can be aware of an agent module associated with a movie website that the user 202 frequently accesses at the computing device 224. The user 202 can select the first selectable element 212 to initialize the automated assistant for interacting with an agent module associated with the food ordering website 206. Simultaneously, the automated assistant can also provide the user 202 with the option of communicating with an agent module associated with a movie website, as illustrated in FIG. 2. For example, the automated assistant can simultaneously provide the selectable element 218 and selectable elements 222, which can each be associated with different actions for different agent modules or websites. In this way, the user is able to vocally communicate with two different agent modules by sequentially speaking two commands (e.g., "order the food delivery and start most recent movie watched") to a single automated assistant accomplishing two separate actions.

Figure 3:
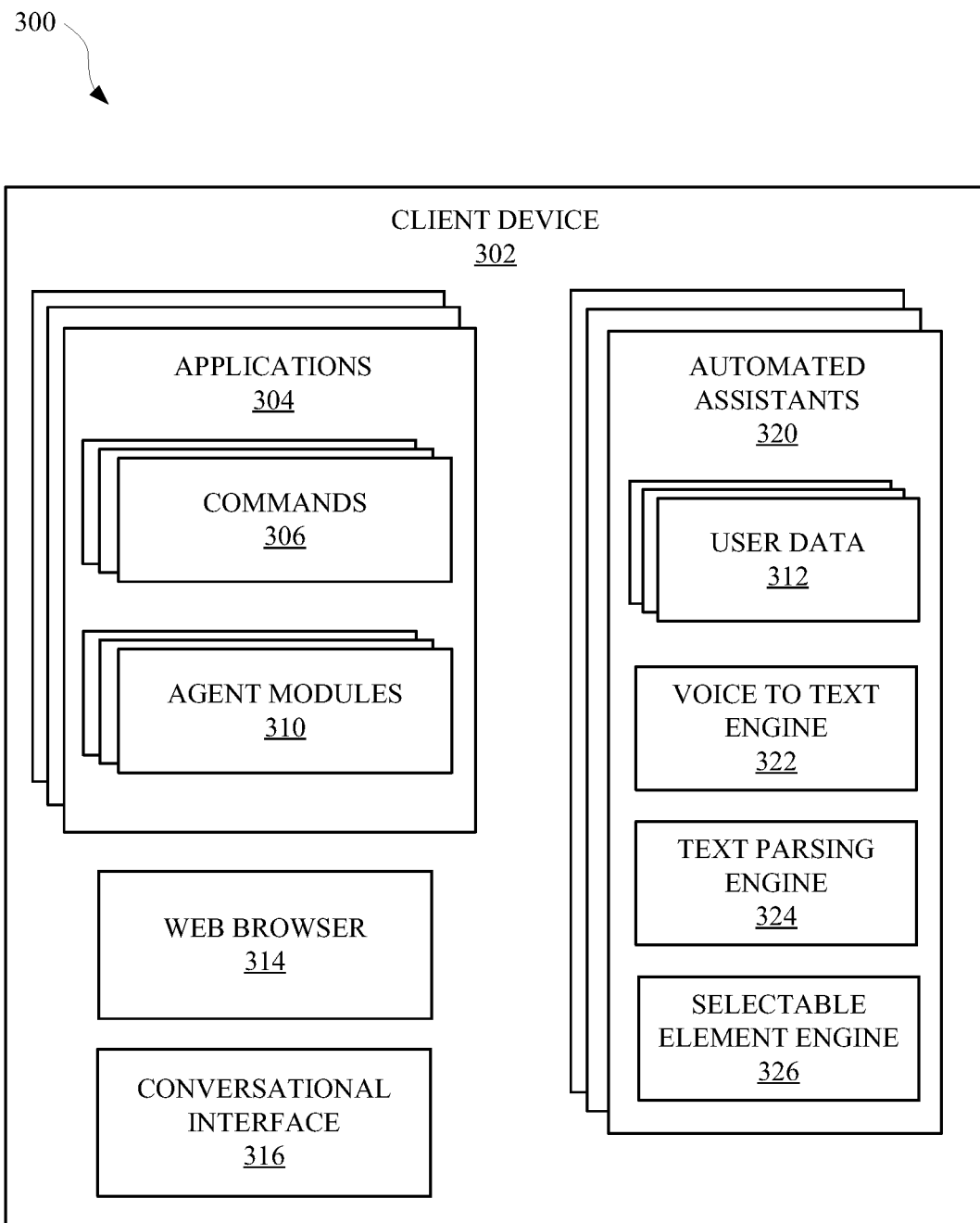
FIG. 3 illustrates a system for providing a conversational interface at a client device in order to familiarize a user with speakable commands that are available for controlling various applications and/or websites.

FIG. 3 illustrates a system 300 for providing a conversational interface 316 at a client device 302 in order to familiarize a user with speakable commands that are available for controlling various applications 304 and/or websites. An application 304 operating at the client device 302 can be associated with one or more agent modules 310 that can assist the user with performing a function associated with the application 304. The agent modules 310 can be stored at the client device 302 or a remote device, such as a server device. In some implementations, the server device can store one or more automated assistants, which are accessible to the client device 302. The automated assistants 320 can receive voice data recorded by a microphone of the client device 302 and interpret the voice data for purposes of controlling certain features of the client device 302 and interacting with the agent modules 310.

In some implementations, the client device 302 and/or the server device can include a selectable element engine 326 that can generate data for providing a selectable element at the client device 302. The selectable element engine 326 can generate selectable elements in order to assist the user with initializing communications with an agent module 310 via an automated assistant 320 for performing functions associated with the applications 304 and/or web browser 314. For example, the selectable element engine 326 can be notified when a user is operating an application 304 or viewing a website at the web browser 314. In response, the selectable element engine 326 can generate a selectable element that, when selected at an interface of the client device 302, can initialize a conversational interface 316 at the client device 302. The selectable element can include a phrase generated by the selectable element engine 326 or provided by an automated assistant 320. The selectable element engine 326 and/or the automated assistant 320 can be aware of an agent module 310 that is associated with the application 304 and provide a phrase for the selectable element that indicates the automated assistant can be used to interact with the agent module 310. For example, the phrase of the selectable element can be "Use automated assistant to perform application function," which can be spoken by the user to open a conversational interface 316. Alternatively, the user can select the selectable element to open the conversational interface 316.

The conversational interface 316 can include multiple different selectable elements that include phrases that can be based on user data 312 tracked by an automated assistant 320. For example, the agent module 310 can correspond to a gaming application 304, and the agent module 310 can accept typed commands from the user. Although the agent module 310 may be designed by a manufacturer to accept typed preconfigured commands 312, an automated assistant 320 can be used to convert spoken words of a user into commands that can be understood by the agent module 310. For example, initially when the user opens the gaming application 304, the selectable element engine 326 can be notified that the gaming application 304 was opened and provide a selectable element with the phrase "Use the automated assistant." The user can thereafter select the selectable element, or speak the phrase, in order to initialize an that automated assistant 320 for communicating with an agent module 310 corresponding to the gaming application 304. When the application 304 is, for example, a chess game application, a conversational interface 316 can be provided with multiple different selectable elements having phrases corresponding to chess moves. The phrases can be based on user data 312, such as previous commands input by the user, data communicated from the agent module 310, and/or parsed application content provided by a text parsing engine 324. In order to select a move corresponding to a selectable element, the user can select a selectable element or speak the phrase located at the selectable element. For example, a selectable element of the conversational interface 316 can include the phrase "move pawn." The selectable element can correspond to a link that identifies the action to be performed (e.g., moving the pawn in the chess application) and can cause the conversational interface 316 to update with additional phrases available for completing the action (e.g., "move to A5"). The link can then be provided to the agent module 310 associated with the application 304.

In some implementations, the user can speak the phrase, and the audio data captured by the client device 302 can be provided to the automated assistant 320 for processing. For example, the automated assistant 320 can include a voice to text engine 322 that can receive the audio data captured by the client device 302 and convert the audio data into text.

The text can correspond to the spoken words of the user while the audio data was being captured by a microphone of the client device 302. The automated assistant 320 can also include a text parsing engine 324 that can parse the text and identify specific words or phrases corresponding to input parameters for the agent modules 310 and/or web sites provided at the web browser 314. The automated assistant 320 can thereafter generate a link or command from the parsed text and send the link or command to an agent module or website for processing. For example, when the user sees the phrase "move pawn" at the conversational interface 316 for the gaming application 304, the user can speak the phrase "move pawn" at the client device 302. The client device 302 can then capture the audio data of the speech and share the audio data with the automated assistant 320. The automated assistant 320 can then generate a link that includes parsed text corresponding to the speech and transmit the link to an agent module 310 or the gaming application 304. For example, the link can be a URL such as "http://assistant.url/chess-agent-module/move-pawn", which can be processed by the agent module 310 and converted into a command for the application 304 to use for furthering the chess game. The link can also be used by the selectable element engine 326 for generating new selectable elements that will replace at least some of the previous selectable elements at the conversational interface 316.

In some implementations, if the user is viewing a website at the web browser 314 and the website is not associated with an agent module 310, the user can still be presented with a conversational interface 316 for interacting with the website. For example, the user can be viewing a hotel website that is not associated with an agent module 310. Regardless, the selectable element engine 326 can cause the client device 302 to display a selectable element that includes the phrase "Use the automated assistant." In this way, the user can be put on notice that the hotel website is available for receiving speakable commands despite there not being an available agent module 310. In response to the user selecting the selectable element or speaking the phrase "Use the automated assistant," the web browser 314 can open the conversational interface 316 in order to present the user with additional selectable elements. The additional selectable elements can be generated by the selectable element engine 326 based on the contents of the website and/or user data 312 that can include data from applications 304, such as messages, calendar data, browser history, order history, driving directions, and/or any other data based on user activities. The selectable element can correspond to a weblink that identifies at least some of the contents of the speakable command and can be processed by a server that is hosting the website. The weblink can then be provided to the website or web browser 314 for furthering the hotel booking process. Should the user choose to speak the phrase "book a hotel in Illinois," as stated at the clickable element, the audio data corresponding to the spoken phrase "book a hotel in Illinois" can be provided to the automated assistant 320. The automated assistant 320 can thereafter convert the speech to text at the voice to text engine 322 and then parse the text at the text parsing engine 324. The parsed text can then be converted into the weblink at the selectable element engine 326 and the weblink can then be provided to the website or web browser 314 for furthering the booking process. Thereafter, the selectable element engine 326 can re-populate the conversational interface 316 with selectable elements for furthering the booking process according to queries received from the agent module 310. For example, the selectable elements can correspond to commands such as "Select booking dates," "Select room size," and/or any other commands related to booking a hotel.

Figure 4A:
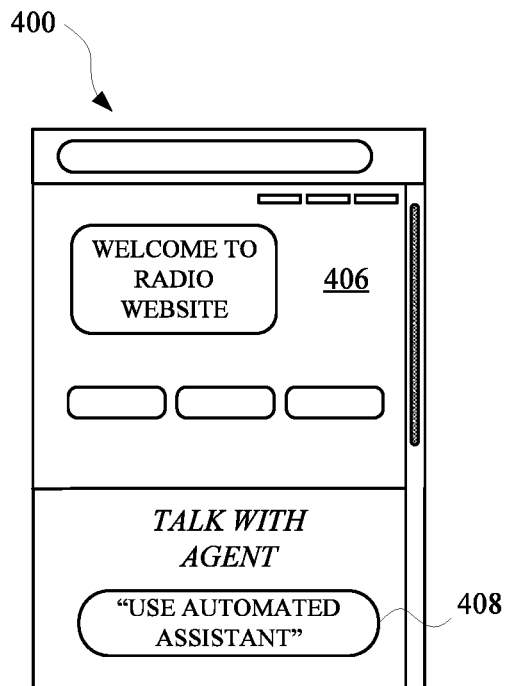
FIG. 4A, FIG. 4B, and FIG. 4C illustrate a conversational user interface being presented at a user interface of a computing device.
Figure 4B:
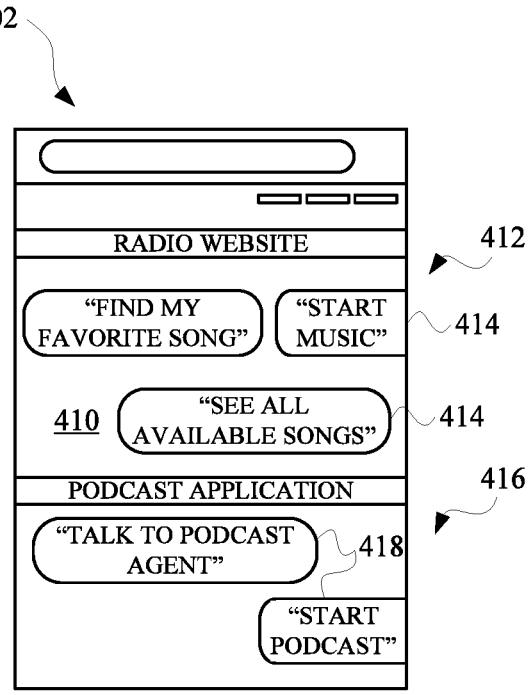
Figure 4C:
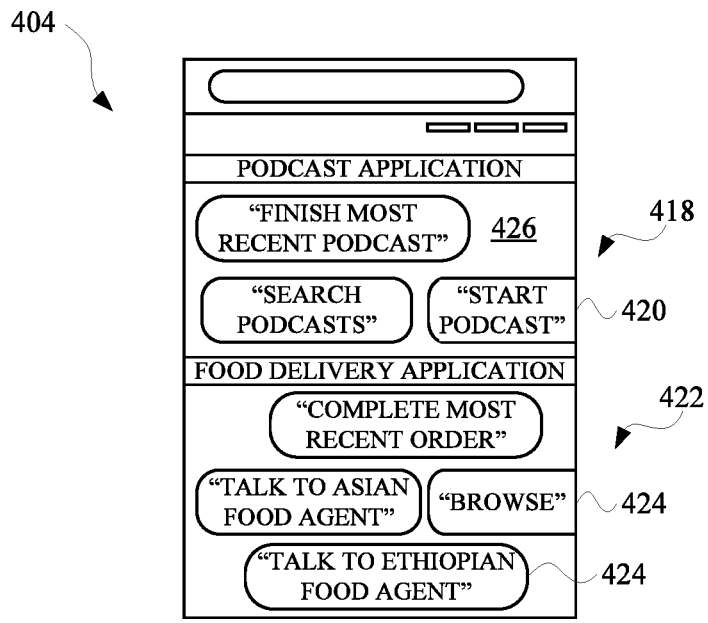

FIGS. 4A-4C illustrate a conversational user interface being presented at a user interface of a computing device. Specifically, diagram 400 of FIG. 4A illustrates a first user interface 406 for a website presented at a web browser of the computing device. The website can be, for example, a radio website that advertises various radio stations that the user can listen to. The website can include a first selectable element 408 that is presented at the first user interface 406. The first selectable element 408 can provide an indication to the user that an automated assistant can be used to interact with an agent module associated with the website. For example, the first selectable element 408 can include the phrase "Use automated assistant," which can be spoken by the user to cause the automated assistant to open a conversational user interface 410 at the computing device. The user can also select the first selectable element 408 by touching the first user interface 406 or providing some other selection command to the computing device. In response to the first user interface 406 being selected, or the phrase spoken by the user, the automated assistant can receive a link identifying an agent module is associated with the website. The automated assistant can also perform a query to identify whether an application associated with the website exists on the computing device or is otherwise accessible to the computing device. The automated assistant can then provide findings at the conversational user interface 410.

The conversational user interface 410 of diagram 402 in FIG. 4B can include a first agent module portion 412 and a second agent module portion 416. The first agent module portion 412 can correspond to a portion of the conversational user interface 410 that relates to an agent module associated with the website. The second agent module portion 416 can correspond to a portion of the conversational user interface 410 that relates to a native application associated with the website. For example, because the radio website is an audio listening website, the automated assistant can identify audio related applications on the computing device, and present speakable commands to the user for interacting with agents associated with the audio related applications. One audio related application can be a podcast application, as illustrated in diagram 400. However in some implementations, the related application can be a third-party application that is unique from a party that controls the automated assistant application.

The automated assistant can simultaneously present selectable elements related to both the agent module associated with the website (e.g., the radio website) and an agent module associated with the related application (e.g., the podcast application). The selectable elements can include speakable command phrases that are based on user data corresponding to interactions between the user and both the website and the application. For example, a first set of selectable elements 414 can correspond to actions that the user previously performed using the website. The speakable command phrase "Start music" can correspond to a start button that the user has selected before in order to start the radio website playing music. The prior selection of the start button, as recorded by the automated assistant, can be converted into a selectable element that can be selected at the conversational user interface 410 and/or spoken to the computing device. Furthermore, the second set of selectable elements 418 can correspond to actions performed by the user at a related application, such as a podcast application. For example, the prior action of the user starting the podcast can be recorded by the automated assistant and used as a basis for providing the selectable element that includes the speakable command phrase "Start podcast."

In some implementations, the conversational user interface 410 can put the user on notice of the ability to talk to agent modules associated with related applications. For example, the conversational user interface 410 can provide a selectable element that includes the speakable command phrase "Talk to podcast agent." In response to selecting the selectable element that reads "Talk to podcast agent," the automated assistant can update the conversational user interface 410 to be a second user interface 426 that includes suggestions related to the podcast application. For example, a first updated interface portion 418 can include multiple different selectable elements 420 corresponding to previous actions or predicted actions recorded by the automated assistant or an agent module associated with the podcast application. Furthermore, a second updated interface portion 422 can be provided by the automated assistant based on user data that relates to historical actions the user previously performed while operating the podcast application. For example, a historical action related to the podcast can be the ordering of a food delivery. The user may have a routine of getting home, turning on a podcast, and ordering food, and therefore the automated assistant can recognize this routine and provide a conversational interface for more efficiently completing the routine. Each selectable element 424 provided at the second updated interface portion 422 can be selected by the user, or spoken verbally to the computing device, in order to perform the actions identified in the speakable command phrases of the selectable elements 424. Moreover, the automated assistant can identify one or more agent modules corresponding to the related application and provide selectable elements 424 that, when selected, can initialize a conversation with an agent module via the automated assistant. For example, the related application (e.g., the food delivery application) can be associated with an Asian food agent and an Ethiopian food agent. Each of the different agent modules associated with the food delivery application can specialize in assisting with categories of actions of the food delivery application, and the automated assistant can put the user on notice that they are able to interface with the agent modules via the automated assistant.

Figure 5:
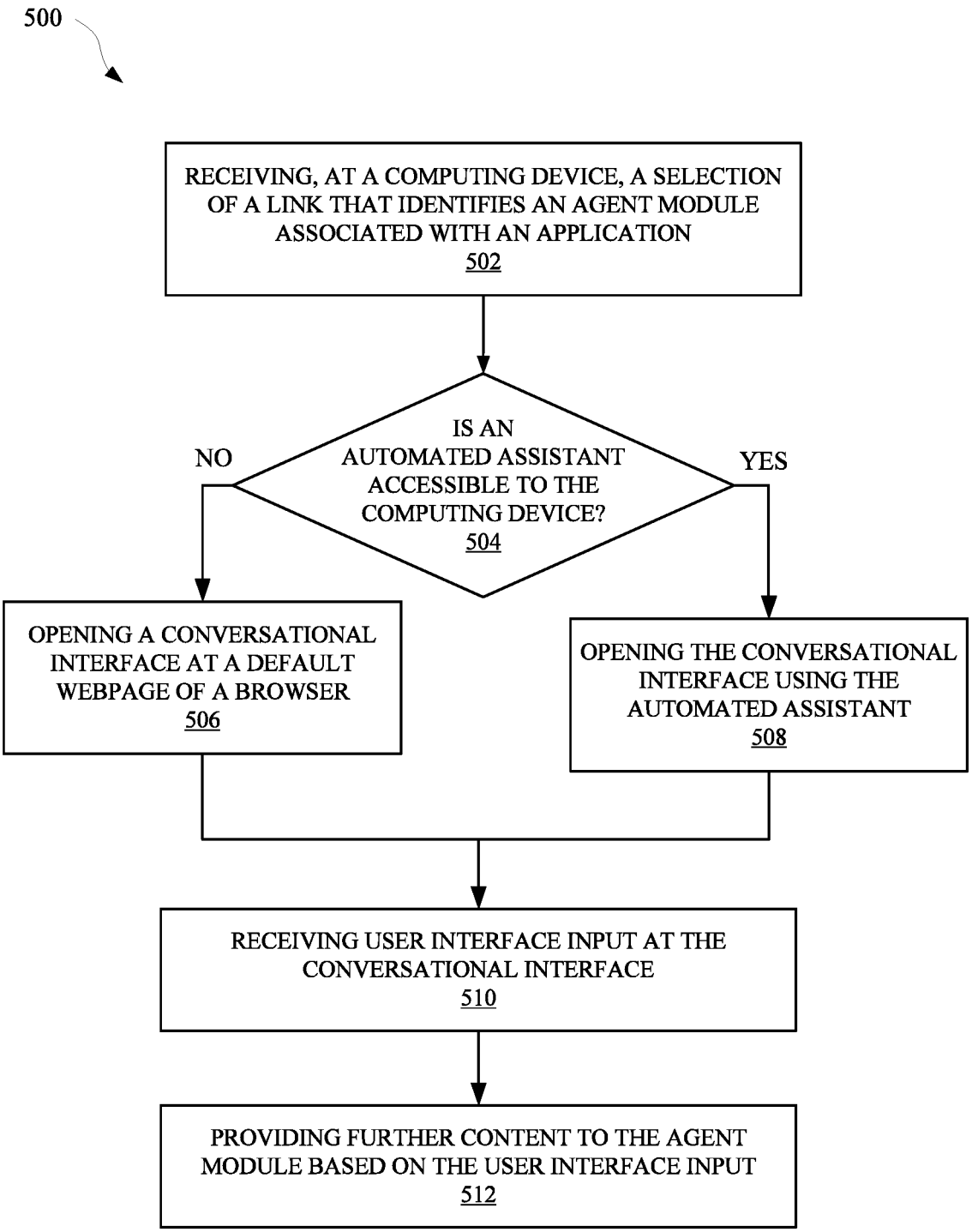
FIG. 5 illustrates a method for causing an agent module to perform a function via an automated assistant.

FIG. 5 illustrates a method 500 for causing an agent module to perform a function via an automated assistant. The method 500 can be performed by a client device, server device, a module or an application operating at a device, and/or any other apparatus suitable for interacting with an application. The method 500 can include a block 502 of receiving, at a computing device, a selection of a link that identifies an agent module associated with an application. The application can be any application on a computing device that includes content that can be manipulated through user input. For example, the application can be a home monitoring application that allows a user to control various devices in their home using the application. The link can be a selectable element that includes a phrase indicating that an automated assistant can be used for interacting with the agent module associated with the application. For example, the link can include the phrase "Use an automated assistant," and the link can be activated by selecting the link or speaking the phrase "Use an automated assistant." At block 504, a determination is made whether an automated assistant is accessible to the computing device. An automated assistant can be a separate application or module that acts as an interface between the agent module and the user, in order to guide the user in performing a function associated with the application. If an automated assistant is available the computing device, then, at block 508, a conversational interface can be opened using the automated assistant. For example, the conversational interface can be opened with the agent module invoked. For instance, the conversational interface can be opened and can present output that is based on content received from the agent module in response to invocation of the agent module. If the automated assistant is not available to the computing device, then, at block 506, the conversational interface can be opened at a default webpage of a browser. At block 510, user interface input is received at the conversational interface. The user interface input can be typed and/or spoken input provided by the user and/or a selection of a selectable element presented at the conversational interface. For example, the user can provide the typed or spoken input to engage in dialog with the agent module (via the conversational interface) and/or can select a presented selectable element that includes a suggested textual phrase or other suggested content for furthering the dialog with the agent module. At block 512, further content is provided to the agent module based on the user interface input received at block 510. The agent module may then generate further responsive content based on the further content provided to the agent module. Such further responsive content (or a conversion thereof) may be provided for presentation to the user in furtherance of the conversation with the user, and the method may optionally proceed back to block 510 to receive further user interface input in response to the further responsive content. The further responsive content generated by the agent module will be dependent on the on the user interface input received at block 510.

Figure 6:
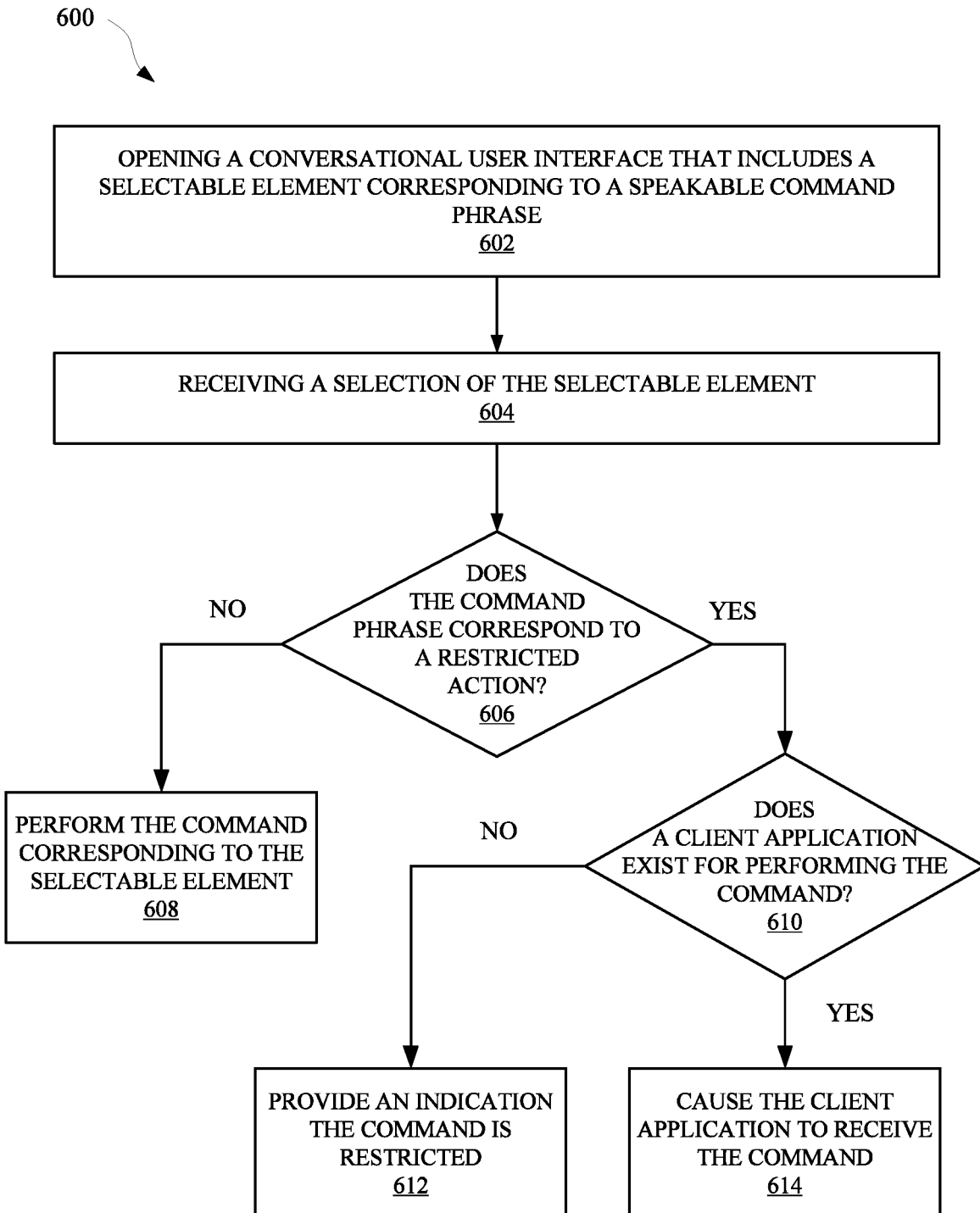
FIG. 6 illustrates a method for restricting operations performed in response to a selection of a selectable element according to whether a native application exists for performing the operations.

FIG. 6 illustrates a method 600 for restricting operations performed in response to a selection of a selectable element according to whether a client application exists for performing the operations. The method 600 can be performed by a client device, server device, a module or an application operating at a device, and/or any other apparatus suitable for interacting with an application. The method 600 can include a block 602 of opening a conversational user interface that includes a selectable element and speakable command phrase. The conversational user interface can include multiple selectable elements that correspond to actions that can be performed by an agent module associated with an application or a website. At block 604, a selection of the selectable element can be received. The selectable element can be selected by a touch interface of a computing device, a peripheral device connected to the computing device, and/or any other mechanism for selecting a selectable element at an interface of a computing device. At block 606, a determination is made whether the command phrase corresponds to a restricted action. A restricted action can be an operation that can use private information about a user during the operation. For example, a non-automated assistant application or website can be a food ordering website and the selectable element can correspond to an operation that orders food using payment information associated with the user. Alternatively, the non-automated assistant application or website can be a social media website and the selectable element can correspond to an operation that publicly posts images of the user. If, at block 606, the command phrase does not correspond to a restricted action, then, at block 608, the command corresponding to the selectable element can be performed. For example, a command that does not correspond to a restricted action can be performing a function in a gaming application or accessing a news article provided by a news website. Such commands by can performed by either speaking the command phrase or selecting the selectable element. If the command phrase does correspond to a restricted action, then at block 610, a determination is made whether a client application exists for performing the command. If the client application exists, then, at block 614, the client application is caused to receive the command. For example, if the command phrase corresponds to an order for food from a website, the client application can be a food ordering application that is associated with the website. In this way, restricted actions can be left to the client application. The command can be provided to the client application in the form of a link, such as URL, that identifies an agent module for performing the command. For example, when the client application is a food ordering application, the link can be, for example, "http://assistant.url/foodwebsite/food%ordering%agent." In this way, the client application can be on notice that the user was previously viewing the food website and they are interested in ordering food, as indicated by the identifier "food%ordering%agent" (where % can be understood as a space). Thereafter, the food ordering agent can be initialized and the conversational user interface can be updated to include different selectable elements corresponding to command phrases for continuing the food order. Otherwise, if a client application does not exist for performing the initial speakable command phrase, then, at block 612, an indication that the command is restricted can be provided at the computing device. The user can thereafter manually continue the order through the website (rather than the conversational user interface), or discontinue the order.

Figure 7:
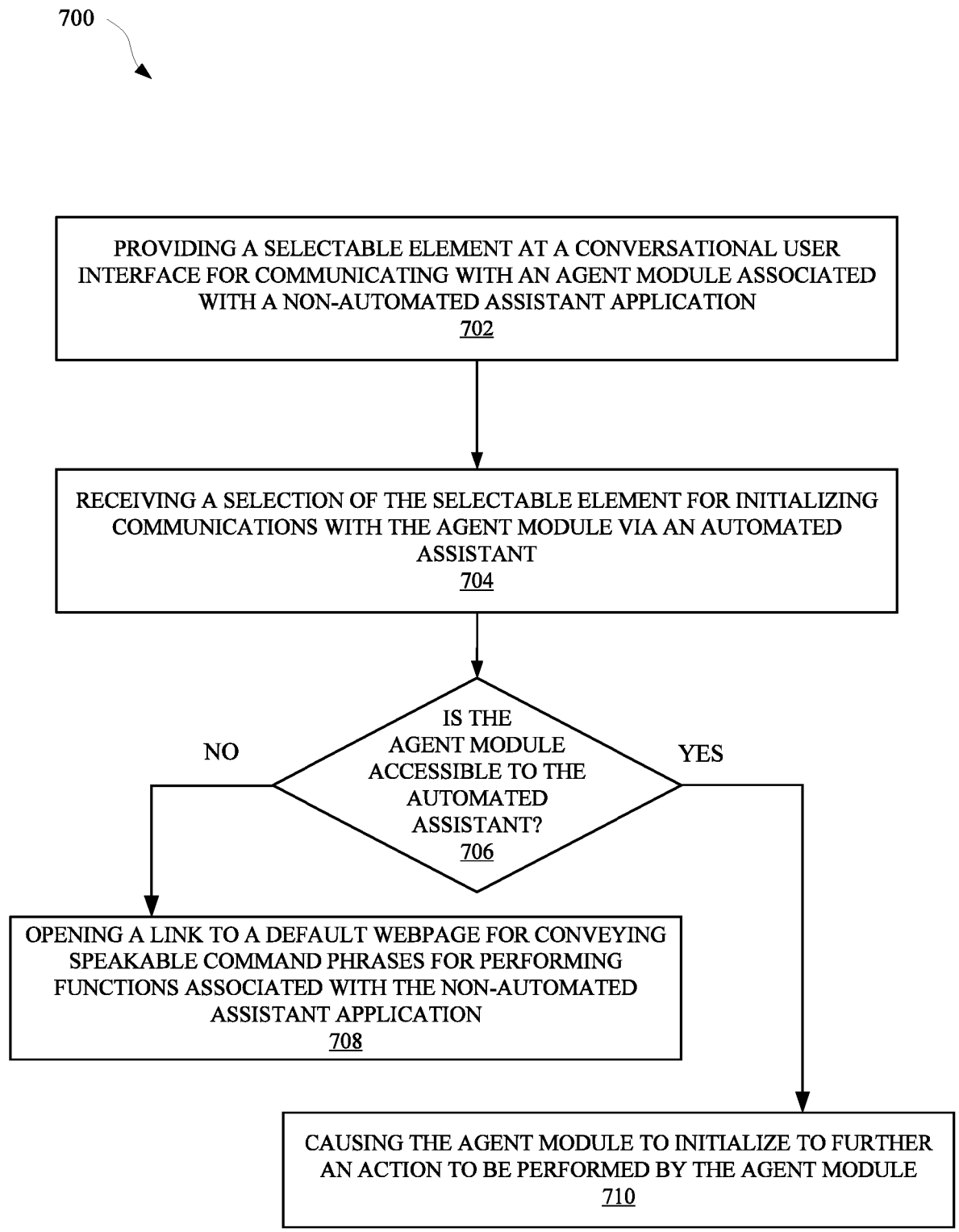
FIG. 7 illustrates a method for interacting with an agent module via an automated assistant according to whether the agent module is accessible.

FIG. 7 illustrates a method 700 for interacting with an agent module via an automated assistant according to whether the agent module is accessible. The method 700 can be performed by a client device, a server device, a module or an application operating at a device, and/or any other apparatus suitable for interacting with an application. The method 700 can include a block 702 of providing a selectable element at a conversational user interface for performing a function associated with the non-automated assistant application. The selectable element can be associated with a link or command that can identify an agent module, an action or intent to be performed by the agent module, and/or parameters for use by the agent module when performing the action or intent. Alternatively, the selectable element can correspond to a command call for initializing the automated assistant. At block 704, a selection of the selectable element can be received by the automated assistant. The automated assistant can then identify the agent module corresponding to the selectable element. At block 706, a determination is made whether the agent module is accessible to the automated assistant. An agent module can be accessible to the automated assistant when the agent module is loaded onto the same device as the automated assistant, or the automated assistant is able to communicate with a network device that includes the agent module. If the automated assistant is able to access the agent module, then, at block 710, the agent module can be initialized in order to further an interaction with the non-automated assistant application. In other words, the automated assistant can act as an interface for the user to communicate more effectively with the agent module. However, if the agent module is not accessible to the automated assistant, then, at block 712, the link corresponding to the selectable element can be opened at a default webpage for conveying speakable command phrases for performing functions associated with the non-automated assistant application via the automated assistant. In this way, the user will still be provided assistance for furthering their interaction with the non-automated assistant application despite there not being an agent module accessible to the automated assistant.

Figure 8:
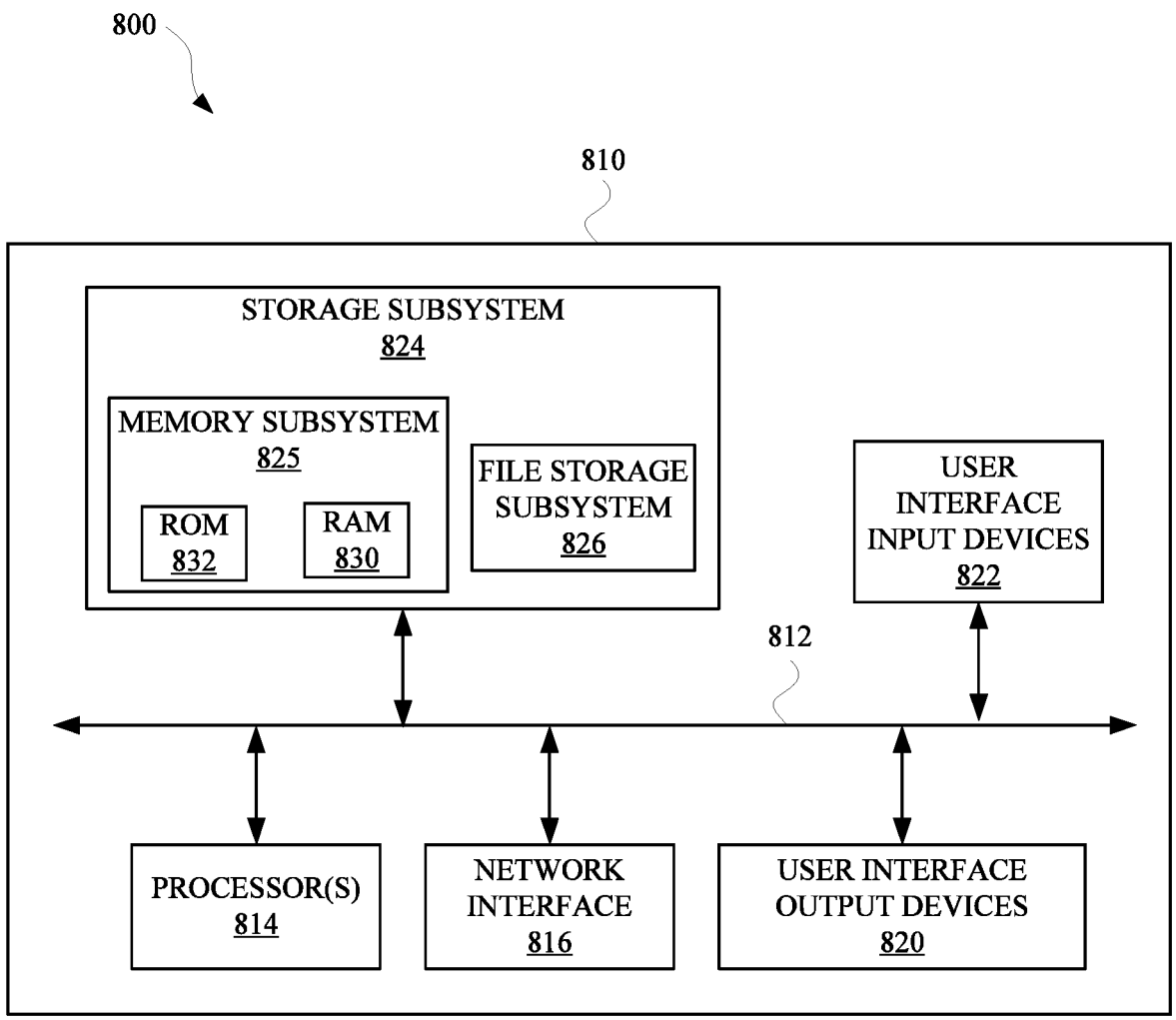
FIG. 8 is a block diagram of an example computer system or computing device.

FIG. 8 is a block diagram 800 of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 can include the logic to perform selected aspects of methods 500, 600, 700, and/or to implement one or more of the server devices, client devices, databases, engines, and/or modules described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    receiving a single selection of a selectable element at a graphical user interface rendered by a non-automated assistant application of a computing device,
    wherein the selectable element has an association with an agent module, the association being a link for, a command for, and/or an intent for the agent module, and
    wherein the agent module can be invoked via an automated assistant application that is separate from the non-automated assistant application;
    in response to the single selection of the selectable element:
        using the association to transition to a conversational automated assistant interface,
        wherein the agent module is invoked in the conversational automated assistant interface that is transitioned to,
        wherein transitioning to the conversational automated assistant interface, in which the agent module is invoked:
            uses the link, the command, and/or the intent, of the association, and
            uses the link, the command, and/or the intent in response to the single selection being of the selectable element and in response to the selectable element having the association, and
        wherein the agent module is one of a plurality of available agent modules that can be invoked via the automated assistant application when the automated assistant is at least temporarily accessible via the computing device;
    receiving, in response to invoking the agent module, responsive content from the agent module; and
    providing, by the automated assistant application via an automated assistant interface, output that is based on the responsive content received from the agent module.

2. The method of claim 1, further comprising:
    in response to receiving the selection of the selectable element:
        receiving a modality parameter that indicates a modality of dialog with the automated assistant, wherein the output is provided via the modality of dialog indicated by the modality parameter.

3. The method of claim 2, wherein the modality is one of voice or text.

4. The method of claim 1, wherein the selectable element identifies a link that is unique to the agent module and invoking of the agent module is based on content of the link.

5. The method of claim 4, wherein, when the automated assistant application is at least temporarily inaccessible via the computing device, the link causes display of further content related to the agent module at the graphical user interface, without invoking the agent module.

6. The method of claim 1, further comprising:
    in response to receiving the selection of the selectable element:
        receiving agent content that includes intent parameters for the agent module,
        wherein invoking the agent module comprises invoking the agent module with the intent parameters indicated by the agent content.

7. The method of claim 6, wherein the intent parameters are dynamically generated through interaction with the non-automated assistant application.

8. The method of claim 1, wherein the agent module is a third-party agent module that is provided by a third-party that is unique from a party that provided the automated assistant application.

9. The method of claim 1, wherein the automated assistant application operates at a separate computing device from the non-automated assistant application and the output is provided by the separate computing device.

10. The method of claim 1, wherein the output that is based on the responsive content received from the selected agent module is a prompt, and the method further comprises:
    receiving natural language input subsequent to providing the prompt;
    providing, to the agent module, further content that is based on the natural language input;

receiving further responsive content from the agent module in response to providing the further content to the agent module; and providing, by the automated assistant application via the automated assistant interface, additional output that is based on the further responsive content received from the agent module.

11. The method of claim 1, further comprising:

generating a link to invoke the agent module, wherein the link includes a name of the agent module and an action to be performed by the agent module, wherein the action to be performed by the agent module is determined based on content of the graphical user interface that is rendered by the non-automated assistant application when the selectable element is selected.

12. The method of claim 11, wherein invoking the agent module via the automated assistant application comprises:

invoking, based on executing the link that includes the name of the agent module and the action to be performed by the agent module, the agent module via the automated assistant.

13. The method of claim 11, wherein the link is a URL link and further includes a first parameter for performing the action, and a value of the first parameter.

14. The method of claim 13, wherein the value of the first parameter is received via user input at an input field displayed via the graphical user interface.

15. A system, comprising: a processor and a non-transitory computer-readable medium coupled to the processor, the non-transitory computer-readable medium having instructions stored thereon, which, when executed by the processor, cause the processor to perform operations comprising:

receiving a single selection of a selectable element at a graphical user interface rendered by a non-automated assistant application of a computing device, wherein the selectable element has an association with an agent module, the association being a link for a command for, and/or an intent for the agent module, and wherein the agent module can be invoked via an automated assistant application that is separate from the non-automated assistant application;

in response to the single selection of the selectable element:

using the association to transition to a conversational automated assistant interface, wherein the agent module is invoked in the conversational automated assistant interface that is transitioned to, and wherein transitioning to the conversational automated assistant interface, in which the agent module is invoked:

uses the link, the command, and/or the intent, of the association, and uses the link, the command, and/or the intent in response to the single selection being of the selectable element and in response to the selectable element having the association;

wherein the agent module is one of a plurality of available agent modules that can be invoked via the automated assistant application when the automated assistant is at least temporarily accessible via the computing device;

receiving, in response to invoking the agent module, responsive content from the agent module; and providing, by the automated assistant application via an automated assistant interface, output that is based on the responsive content received from the agent module.

16. The system of claim 15, wherein the computer-readable medium having further instructions stored thereon, which, when executed by the processor, cause the processor to perform operations comprising:

in response to receiving the selection of the selectable element:

receiving a modality parameter that indicates a modality of dialog with the automated assistant, wherein the output is provided via the modality of dialog indicated by the modality parameter.

17. The system of claim 16, wherein the modality is one of voice or text.

18. The system of claim 15, wherein the selectable element identifies a link that is unique to the agent module and invoking of the agent module is based on content of the link.

19. The system of claim 18, wherein, when the automated assistant application is at least temporarily inaccessible via the computing device, the link causes display of further content related to the agent module at the graphical user interface, without invoking the agent module.

20. A non-transitory computer-readable medium having instructions stored thereon, which, when executed by a processor, cause the processor to perform operations, comprising:

receiving a single selection of a selectable element at a graphical user interface rendered by a non-automated assistant application of a computing device, wherein the selectable element has an association with an agent module, the association being a link for, a command for, and/or an intent for the agent module, and wherein the agent module can be invoked via an automated assistant application that is separate from the non-automated assistant application;

in response to the single selection of the selectable element:

using the association to transition to a conversational automated assistant interface, wherein the agent module is invoked in the conversational automated assistant interface that is transitioned to, and wherein transitioning to the conversational automated assistant interface, in which the agent module is invoked;

uses the link, the command, and/or the intent, of the association, and uses the link, the command, and/or the intent in response to the single selection being of the selectable element and in response to the selectable element having the association;

wherein the agent module is one of a plurality of available agent modules that can be invoked via the automated assistant application when the automated assistant is at least temporarily accessible via the computing device;

receiving, in response to invoking the agent module, responsive content from the agent module; and providing, by the automated assistant application via an automated assistant interface, output that is based on the responsive content received from the agent module.

* * * * *